US008726279B2

(12) United States Patent
Avkarogullari et al.

(10) Patent No.: US 8,726,279 B2
(45) Date of Patent: May 13, 2014

(54) SYSTEM FOR MULTI THREADED MULTI PROCESSOR SHARING OF ASYNCHRONOUS HARDWARE UNITS

(75) Inventors: Gokhan Avkarogullari, San Jose, CA (US); Steven L. Petersen, Los Gatos, CA (US)

(73) Assignee: Nvidia Corporation, Santa Clara, CA (US)

( * ) Notice: Subject to any disclaimer, the term of this patent is extended or adjusted under 35 U.S.C. 154(b) by 1715 days.

(21) Appl. No.: 11/382,025

(22) Filed: May 6, 2006

(65) Prior Publication Data

US 2007/0261053 A1    Nov. 8, 2007

(51) Int. Cl.
G06F 9/46 (2006.01)
G06F 12/00 (2006.01)
G06F 9/52 (2006.01)

(52) U.S. Cl.
CPC ..................................... G06F 9/526 (2013.01)
USPC ............ 718/100; 718/102; 718/104; 710/200

(58) Field of Classification Search
USPC .................... 718/100, 101, 102, 104, 107, 1; 710/200
See application file for complete search history.

(56) References Cited

U.S. PATENT DOCUMENTS

| 4,574,350 | A | * | 3/1986 | Starr .............................. 710/200 |
| 5,285,528 | A | * | 2/1994 | Hart ............................... 710/200 |
| 5,408,629 | A | * | 4/1995 | Tsuchiya et al. ............... 711/151 |
| 5,437,042 | A |   | 7/1995 | Culley et al. |
| 5,550,965 | A |   | 8/1996 | Gabbe et al. |
| 5,613,139 | A | * | 3/1997 | Brady ............................ 710/200 |
| 5,649,230 | A |   | 7/1997 | Lentz |
| 5,678,026 | A | * | 10/1997 | Vartti et al. .................... 711/152 |
| 5,724,610 | A |   | 3/1998 | Han et al. |
| 5,884,027 | A |   | 3/1999 | Garbus et al. |
| 5,963,976 | A |   | 10/1999 | Ogawa et al. |
| 6,105,049 | A | * | 8/2000 | Govindaraju et al. ........ 718/102 |
| 6,122,699 | A |   | 9/2000 | Omo et al. |
| 6,412,028 | B1 |   | 6/2002 | Steed et al. |
| 6,668,287 | B1 |   | 12/2003 | Boyle et al. |
| 6,782,440 | B2 | * | 8/2004 | Miller ............................ 710/200 |
| 6,823,472 | B1 |   | 11/2004 | DeKoning et al. |

(Continued)

FOREIGN PATENT DOCUMENTS

TW    200305105    10/2003

OTHER PUBLICATIONS

Atmel Corporation; Software DMA Implementation; Rev.1169A-10/98; Oct. 1998; pp. 1-7.

(Continued)

*Primary Examiner* — Diem Cao
*Assistant Examiner* — Willy W Huaracha

(57) ABSTRACT

Methods and system for sharing a hardware resource in a computer system running at least one software process having multiple threads. A lock_indicator is provided in data structures within the computer system. A request is received to use the hardware resource by one of the threads that is defined to be a requesting tread. Based on the lock_indicator, it is determined whether the hardware resource is available for use by the requesting thread. If this indicates that the hardware resource is available, the lock_indicator is set under control of the hardware resource to instead indicate that the hardware resource is unavailable, and a go_indicator signals to indicate that use of the hardware resource for the request can now proceed.

16 Claims, 9 Drawing Sheets

(56) References Cited

U.S. PATENT DOCUMENTS

| | | | |
|---|---|---|---|
| 2005/0071841 A1* | 3/2005 | Hoflehner et al. | 718/100 |
| 2007/0288931 A1* | 12/2007 | Avkarogullari | 719/312 |
| 2007/0294702 A1* | 12/2007 | Melvin et al. | 718/104 |
| 2008/0005741 A1* | 1/2008 | Terrell | 718/102 |
| 2012/0143838 A1* | 6/2012 | Ross et al. | 707/704 |

OTHER PUBLICATIONS

Andrew S. Tanenbaum; Structured Computer Organization; 1984; Prentice-Hall, Inc.; Second Edition, pp. 10-12.

Intel ®; 8237A High Performance Programmable DMA Controller; Sep. 1993; Order No. 231466-005; pp. 1-19.

* cited by examiner

Data Structures

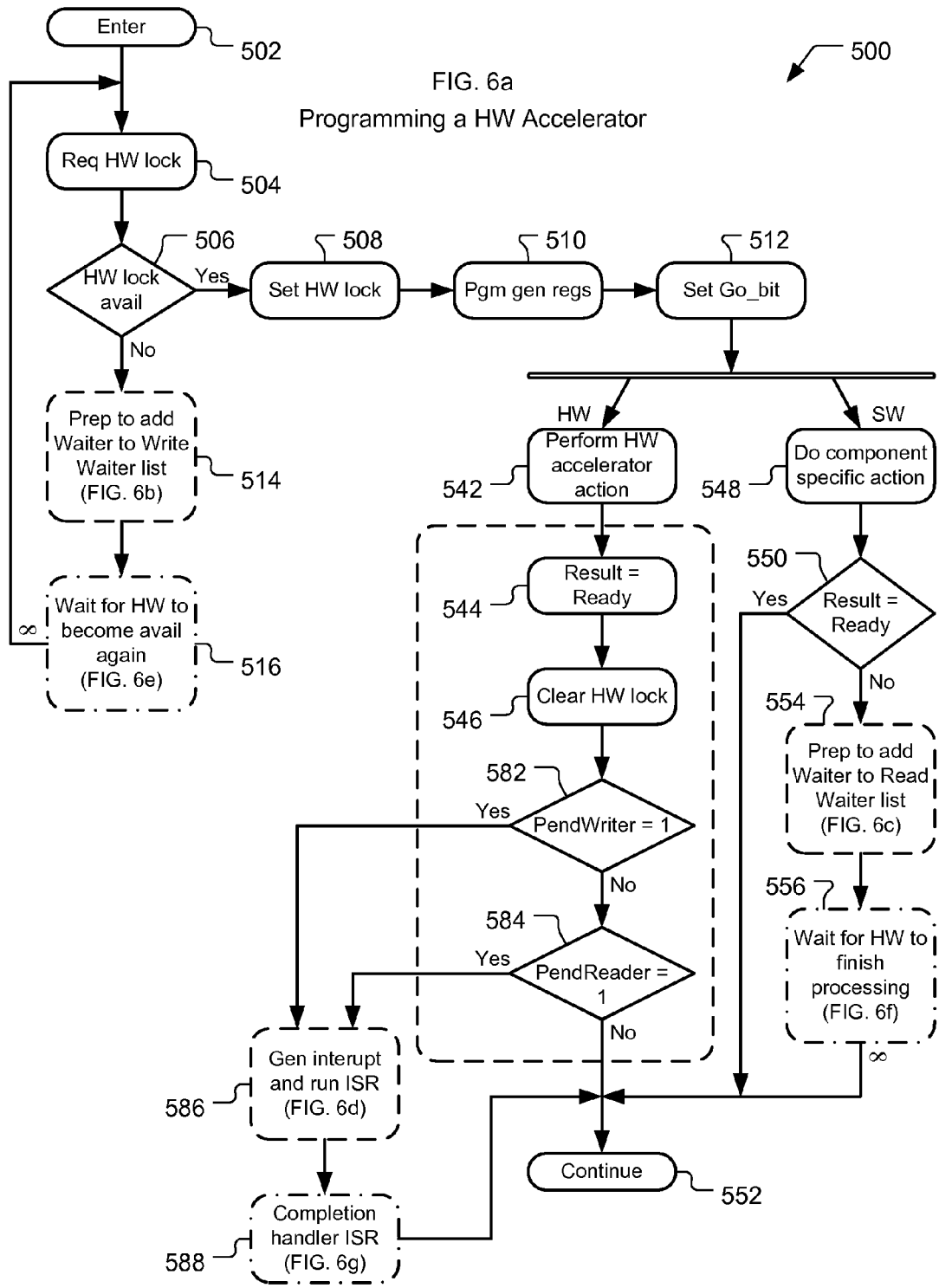

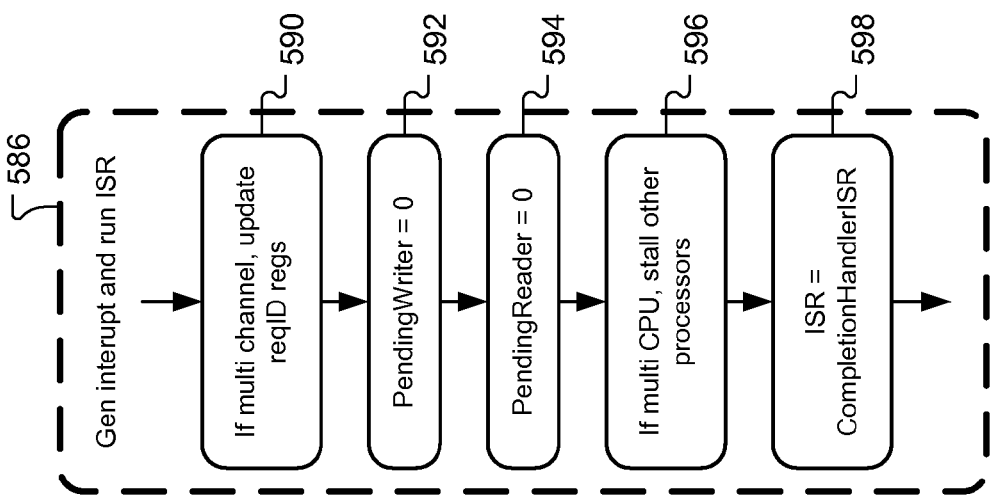
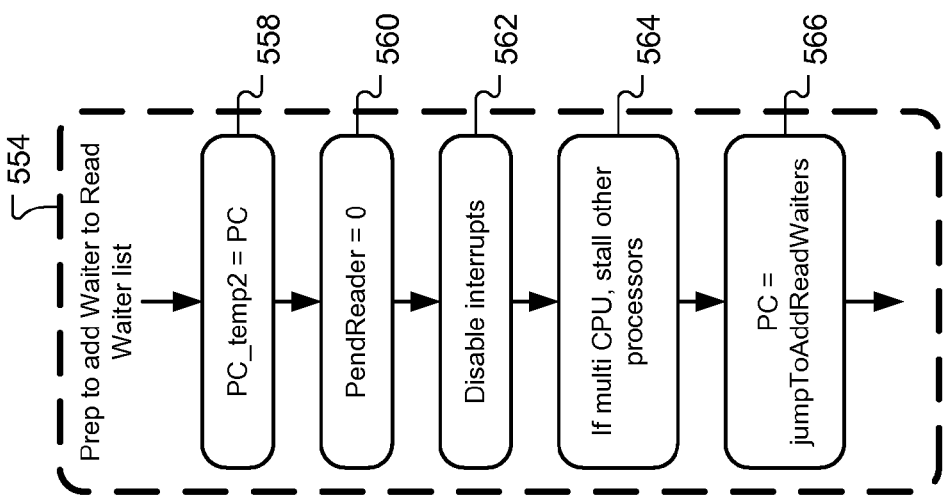
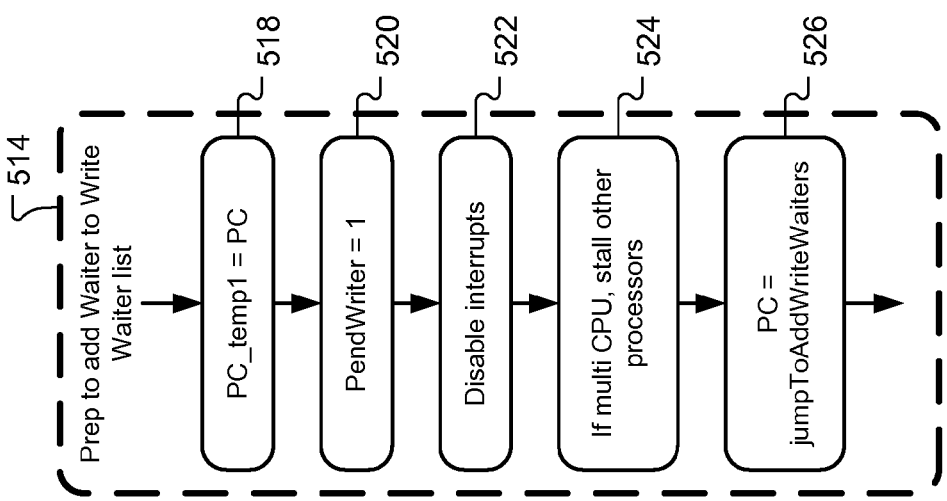

SYSTEM FOR MULTI THREADED MULTI PROCESSOR SHARING OF ASYNCHRONOUS HARDWARE UNITS

TECHNICAL FIELD

The present invention relates generally to input and output in electrical computers and digital data processing systems, and more particularly to means or steps for preventing access to shared resources in such systems.

BACKGROUND ART

In modern computer systems it is increasingly common for the software processes (SW) running on the processor or processors to use multiple threads of executions. These threads of executions may demonstrate a perceived concurrency, when multiple threads are run on a same processor, or a true concurrency when there are multiple processors in the computer system.

Additionally, it is increasingly common in modern computer systems to have sophisticated hardware resources (HW), such as direct memory access (DMA) channels; peripherals with internal buffering or internal DMA engines; and media processing elements that work from a private memory area, internal buffers, or that use DMA. Some hardware resources also may have multiple channels, thus increasing the number of effective hardware resources that can be running simultaneously and that also need to be managed. [Since a multiple channel device is effectively usable by a computer system as multiple resources, we herein use the label "hardware resource" for each channel to avoid confusion with "hardware device."]

The hardware resources in a computer system are often desirably made asynchronous, so that the processor or processors managing them can program each for a desired task, continue with something else, and later come back and get the result to the earlier programmed task. This creates true parallelism.

When a hardware resource is used by multiple threads of execution, regardless of the nature of the concurrency of the threads, some mechanism must be available to make sure that only one thread of execution at a time uses the hardware resource. This is necessary to secure the correct operation of the hardware resource and to insure that the results obtained by the threads of execution are correct. This is where the prior art approaches are still wanting, because they are based on software locks (e.g., software mutual exclusion locks, often termed a "mutex").

FIGS. 1a-b (background art) are block diagrams stylistically showing examples of how a modern computer can be a very complex system. FIG. 1a shows a simpler computer system having a single main processor, and FIG. 1b shows a more complex computer system having multiple main processors. Under the control of an operating system (OS), each processor can potentially run multiple software processes (not directly shown here). For present purposes we are not especially concerned with the software processes at a high level, but rather with basic portions of them that we term "threads of execution" (TOE). Threaded program execution is covered in many excellent texts on the computing arts, so we merely note here that a single software process may have a single thread, or multiple threads, and that all of these may be in competition for resources within the overall computer system. In particular, the threads of execution in a computer system may need to asynchronously share one or more hardware resources (HWR).

Turning now to FIG. 1a, TOE #2 represents the simplest case for a thread of execution. It is not using and it is not waiting for any hardware resources. Similarly, HWR #1 represents a simple case. No thread of execution is using it and none are waiting to use it. TOE #1 and HWR #2 represent a slightly more complex case. TOE #1 is using HWR #2, and no other threads of execution are waiting to use it.

Things rarely stay as simple as just described. For example, what if TOE #1 is using HWR #2 and TOE #2 needs to use HWR #2 too? In a conventional computer system the operating system manages access to the hardware resources with software locks. A dialog like the following can take place:

(1) TOE #1: I need to use HWR #2.
(2) OS: (After checking its locks & updating them) OK TOE #1, go ahead.
(3) TOE #2: I need to use HWR #2.
(4) OS: (After checking its locks) No TOE #2, wait.
(5) TOE #1: I am finished with HWR #2.
(6) OS: (After updating its locks) OK TOE #2, go ahead.
. . .

This dialog is simplistic and does not cover all possible cases. For instance, what if step (4) never occurs, say, because TOE #1 crashes or is poorly programmed? The operating system has to also handle this.

Turning now to FIG. 1b, several more complex scenarios are depicted there, ones that are all increasingly common in modern computer systems. For example, in addition to multiple processors, these may be running different operating systems (e.g., the Windows™ operating system in Processor #1 and the Linux operating system in Processor #2). As also represented in FIG. 1b, and discussed presently, the hardware resources can themselves have sophisticated features that should also be considered.

In FIG. 1b a scenario is shown that is similar to the one underlying the dialog described above. Here TOE #2 is using HWR #3 and TOE #3 also wants to use it. For instance, say, HWR #3 is a printer and TOE #2 using it to print text characters, whereas HWR #3 wants to use it to print an image.

Again, the conventional approach is to have the operating systems controlling the respective threads of execution manage such contention for the hardware resources with a scheme of software locks. Typically, such a software lock is implemented as a mutual exclusion object (often termed a "mutex").

A mutex is a program object that allows multiple threads of execution to share the same hardware resource, such as file or printer access, just not simultaneously. When a thread of execution is started, a uniquely named mutex for each shared hardware resource is created and managed by the operating system (or systems). Any thread of execution that needs the resource then locks the mutex while it is using the hardware resource, thus preventing possible interference from other threads of execution. The mutex is unlocked when the hardware resource is no longer needed or when the thread of execution using it is finished.

Continuing with FIG. 1b, TOE #4 here represents a case where a serious problem can occur. If a simple conflict resolution mechanism is used to handle the situation just described for TOE #2 and TOE #3, TOE #4 can end up stalled waiting for TOE #3 to get its turn to use HWR #3. Most sophisticated operating systems today have mechanisms to avoid this scenario, albeit ones that may not be as efficient as desired. But not all computer systems use such operating systems, and in many applications there is no other reason for using such a sophisticated operating system and incurring the inherent burdens that go with that. Accordingly, there remains a need today for an inherently less burdensome mechanism for accessing hardware resources in computer systems. That is, one that does not unduly require more sophisticated or burdensome operating system capabilities than a particular application may actually need.

Also, somewhat as foreshadowing, FIG. 1b depicts HWR #3 and HWR #4 as being part of a multi-channel hardware device (Multi-channel HW). Thus, if HWR #4 is another printer in a pool of collective printers that are equal in all relevant respects to HWR #3, it would be nice if our hypothetical print job from TOE #3 could simply be rerouted to HWR #4. Traditionally, it has been left to the operating systems in computer systems to manage such multi-channel hardware resources.

Turning now also to FIG. 2 (background art), it is a listing of pseudo code that represents how TOE #2 would obtain the use of HWR #3 in a scheme where traditional software locks are employed. First, ownership of HWR #3 is established with OS #2 on processor #2 (i.e., Lock #2 in FIG. 2). Then ownership is established with OS #1 on processor #1 (i.e., Lock #1). TOE #2 can now use HWR #3, until its use finishes or one of the operating systems steps in. Then Lock #1 is released. And then Lock #2 is released. As discussed next, the areas marked in FIG. 2 with asterisks are ones of particular interest.

FIGS. 3a-d (background art) are a series of timing diagrams that respectively show two representative cases, also a hypothetical situation approaching the worst case, and also a hypothetical situation approaching the best case for threads of execution accessing available (idle) hardware resources. FIGS. 3a-c progressively show the effect of increased speed of the hardware resource on performance in a traditional computer system. An important point to observe here is that, regardless of the duty cycle for the respective hardware resources, the duty cycle for software lock management remains essentially fixed (of course, it can increase if a hardware resource is not idle). Thus, as represented by FIG. 3c, the worse case is one where a thread of execution is spending most of its processor time dealing with the overhead of accessing hardware resources, rather than getting actual work done.

In contrast, FIG. 3d represents the best case, one where a thread of execution spends little of its processor time on the overhead of accessing hardware resources, and thus gets more actual work done. The case depicted in FIG. 3d is clearly desirable, but it is unattainable under the presently conventional schemes. There is inherently a limit to the extent that the software used for a processor-based software lock can be optimized, and in most operating systems today that limit has pretty much been reached.

For example, depending on the implementation of a mutex, its "overhead" can be on the order of 10s of microseconds, to lock and unlock the mutex to maintain atomic access to a given hardware resource. This is exacerbated when operating systems with protected process memory spaces are used, such as Linux and Windows™. This is also exacerbated when a mutex needs to be multiple processor safe. The magnitude of the overhead in these increasingly common cases may then even be significantly higher, tending to negate both the performance advantages of using a hardware accelerator as well as the advantages of making a hardware resource asynchronous. Furthermore, multi-processor safe locks are usually implemented as spin locks, and all of this may result in priority inversion across the multiple processors.

Accordingly, there especially remains a need today for a more efficient mechanism for accessing hardware resources in computer systems.

DISCLOSURE OF INVENTION

Accordingly, it is an object of the present invention to provide a system for efficiently sharing asynchronous hardware units in a multi threaded computer system.

Briefly, one preferred embodiment of the present invention is a system for sharing a hardware resource in a computer system able to run at least one software process having multiple threads. A system of data structures within the computer system includes a lock_indicator. A provided logic receives a request to use the hardware resource by one of the threads that is defined to be a requesting tread. A provided lock logic determines, based on the lock_indicator, whether the hardware resource is available for use by the requesting thread. A provided logic responsive to the lock logic then controls a provided logic to set the lock_indicator to instead indicate that the hardware resource is unavailable and a provided logic to signal with a go_indicator that use of the hardware resource for the request can proceed. The logic that sets the lock_indicator particularly operates under control of the hardware resource.

These and other objects and advantages of the present invention will become clear to those skilled in the art in view of the description of the best presently known mode of carrying out the invention and the industrial applicability of the preferred embodiment as described herein and as illustrated in the figures of the drawings.

BRIEF DESCRIPTION OF THE DRAWINGS

The purposes and advantages of the present invention will be apparent from the following detailed description in conjunction with the appended figures of drawings in which:

FIGS. 1a-b (background art) are block diagrams that stylistically show the potential complexity of a modern computer system, wherein FIG. 1a shows a simpler computer system having a single main processor, and FIG. 1b shows a more complex computer system having multiple main processors.

FIGS. 6a-g are a series of flow charts that depict a process where a hardware locking system in accord with the present invention is used to program a hardware accelerator, wherein FIG. 6a shows an overall flowchart, FIGS. 6b-d show the details of "atomic" steps that are performed by hardware, and FIGS. 6e-g show the details of steps that are performed by software.

In the various figures of the drawings, like references are used to denote like or similar elements or steps.

BEST MODE FOR CARRYING OUT THE INVENTION

Figure 1A:
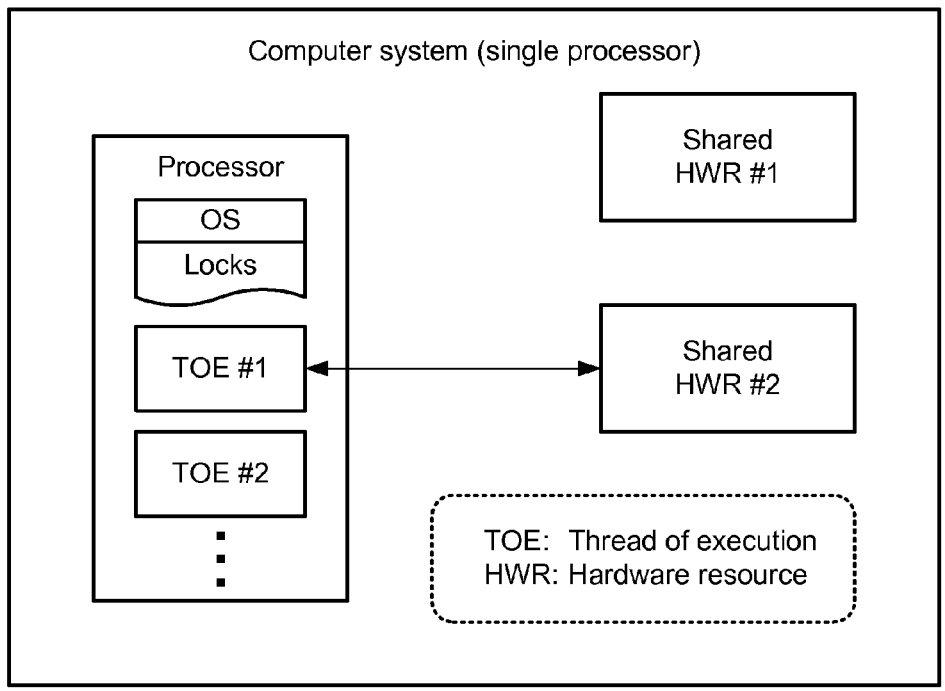
Figure 2:
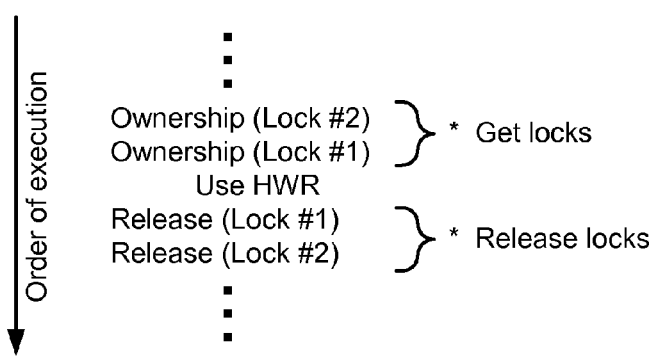
FIG. 2 (background art) is a pseudo code listing representing how a thread of execution would obtain the use of a hardware resource in a scheme where traditional software locks are employed.

A preferred embodiment of the present invention is a system for the sharing of asynchronous hardware resources in a multi threaded and potentially a multi processor computer system. As illustrated in the various drawings herein, and particularly in the view of FIG. 4, preferred embodiments of the invention are depicted by the general reference character 10.

Simply put, the present inventors have observed that the deficiencies in the prior art approaches are due to the operating system or operating systems that use these being only loosely tied to the actual hardware resources. Conversely, this has lead the inventors to the realization that the way to obtain tighter control, and thus more optimal use, of the hardware resources is to have them participate actively in managing the locks that control their use. The inventors term this new approach "hardware locks," even though portions of the work involved is still handled by the operating system or operating systems.

Figure 1B:
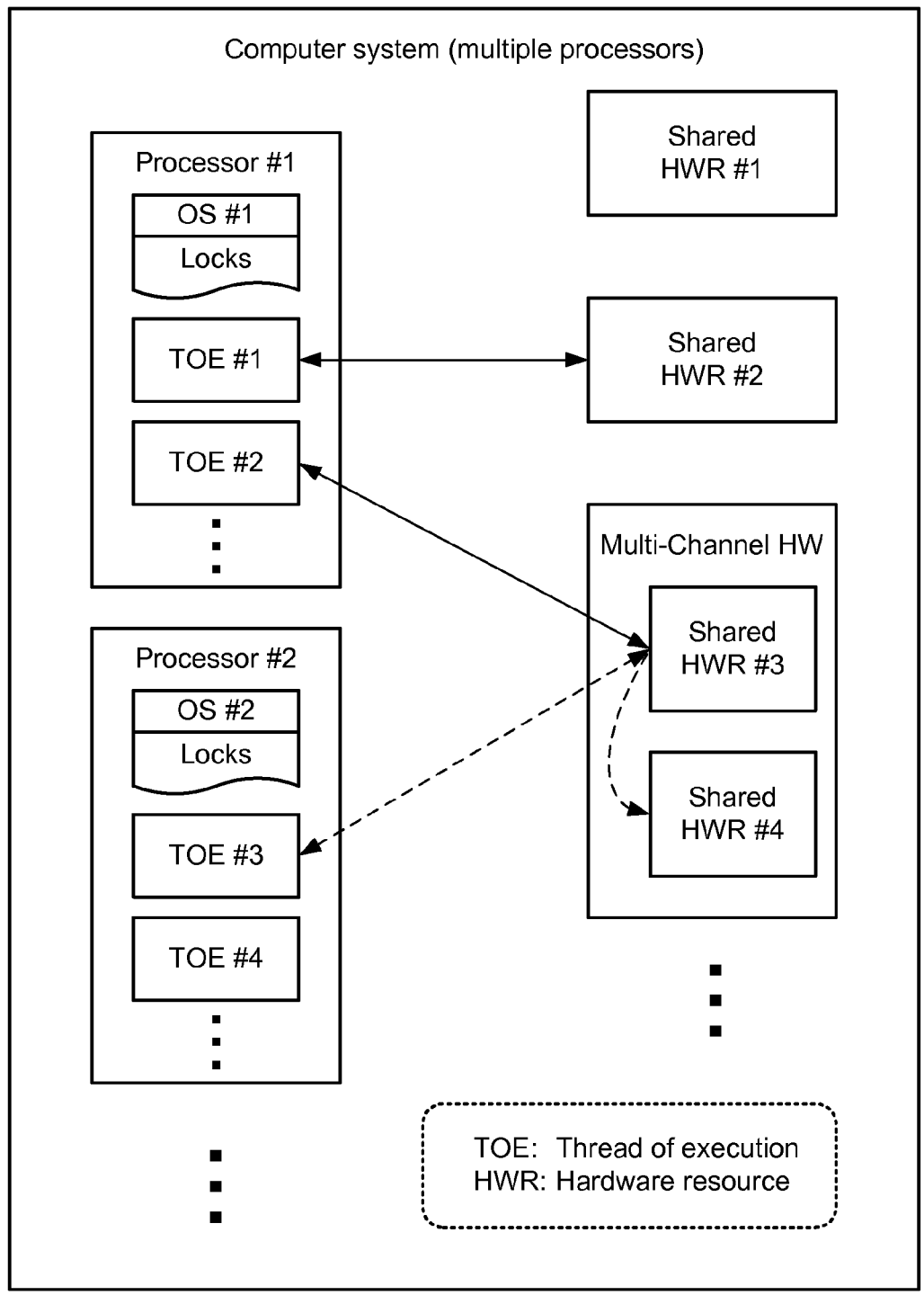
Figure 3A:
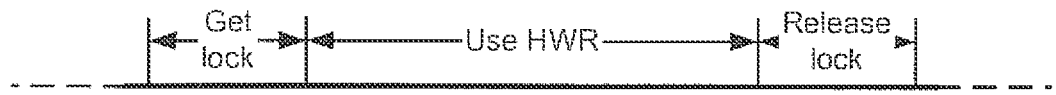
FIGS. 3a-d (background art) are a series of timing diagrams that respectively show two representative cases, a hypothetical situation approaching the worst case, and a hypothetical situation approaching the best case for threads of execution accessing idle hardware resources.
Figure 3B:
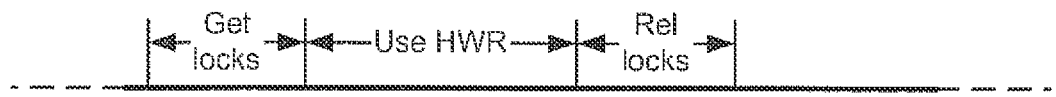
Figure 3C:
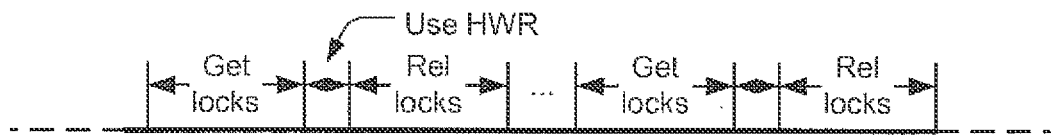
Figure 3D:
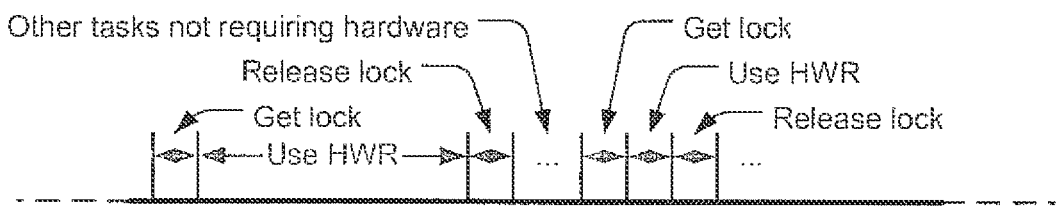
Figure 4:
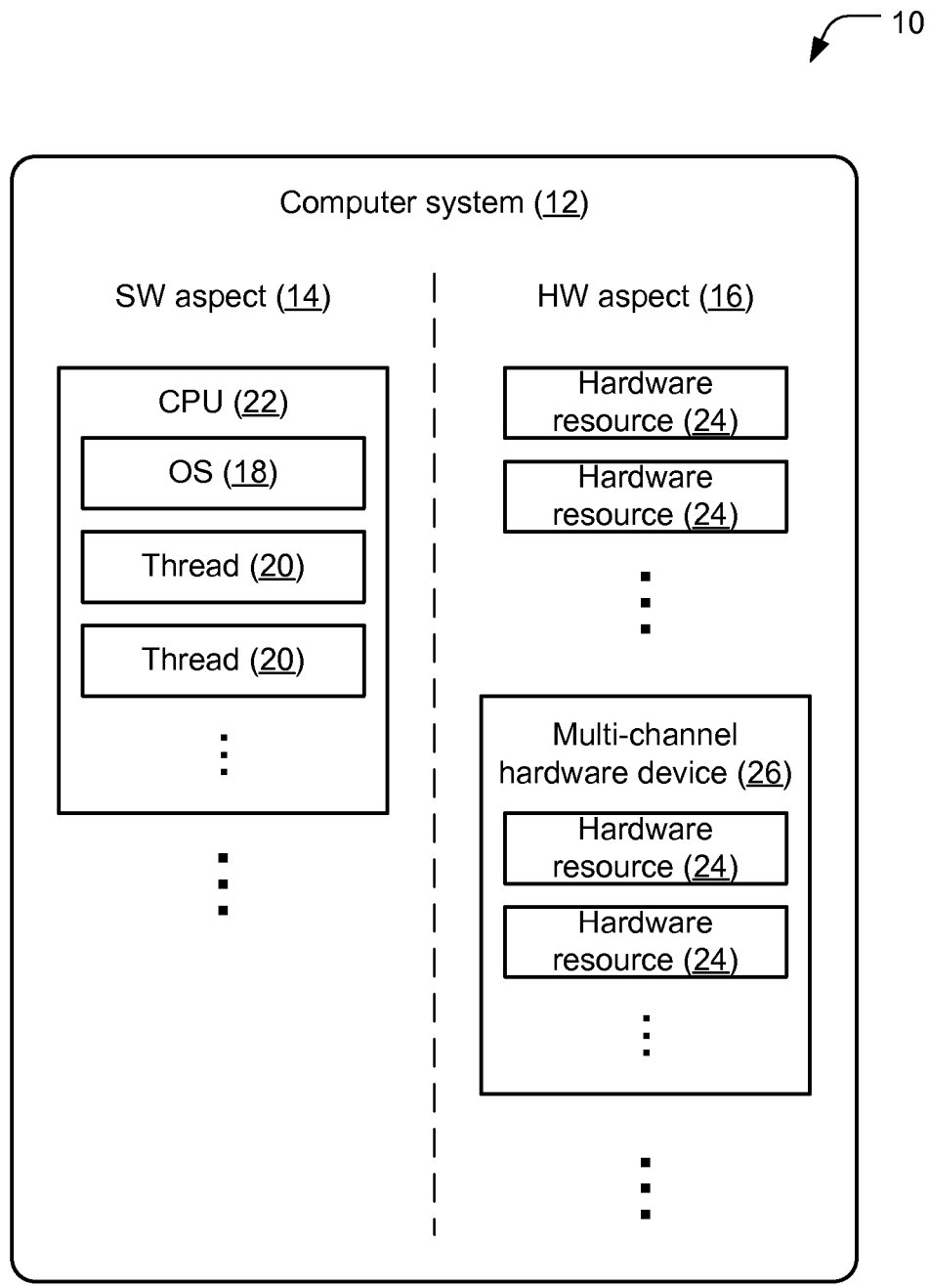
FIG. 4 is a schematic block diagram depicting how a hardware locking system in accord with the present invention relates to a modern computer system.

With reference briefly back to FIGS. 1a-b and now also to the schematic block diagram in FIG. 4, it can be appreciated how the inventive hardware locking system 10 relates to a modern computer system 12. Generally, and especially for the sake of the following disclosure, the computer system 12 can be viewed as having a software aspect (SW aspect 14) and a hardware aspect (HW aspect 16). The SW aspect 14 includes the operating system (OS 18), or operating systems if multiple ones are employed, and it includes the threads of execution (threads 20). Although somewhat awkward in the general computing context, but consistent here for reasons that will become apparent, the processor (CPU 22), or processors if multiple ones are employed, are included in the SW aspect 14. In contrast, the HW aspect 16 includes the hardware resources 24 used by the SW aspect 14, and this can optionally include multi-channel hardware devices 26 that, in turn, include more than one effective hardware resource 24.

Figure 5:
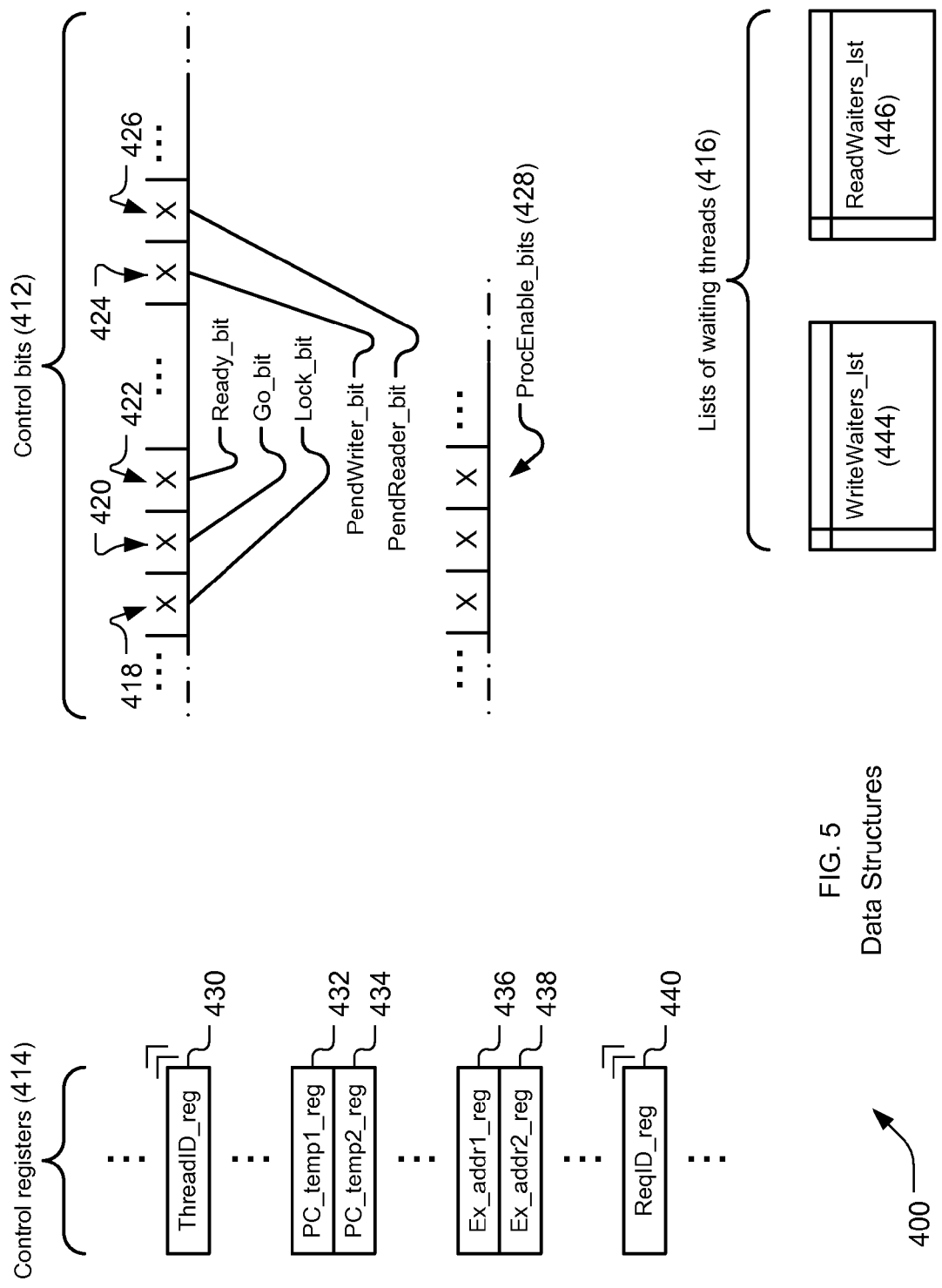
FIG. 5 is a schematic block diagram that depicts the major data structures in an exemplary embodiment of the inventive hardware locking system of FIG. 4.

FIG. 5 is a schematic block diagram that depicts the major data structures 400 in an exemplary embodiment of the inventive hardware locking system 10. These data structures 400 include control bits 412, control registers 414, and waiting lists 416.

The control bits 412 maintained for each hardware resource 24 include a Lock_bit 418, a Go_bit 420, a Ready_bit 422, a PendWriter_bit 424, and a PendReader_bit 426. The Lock_bit 418 serves to signal that the hardware resource 24 is locked. The Go_bit 420 serves to signal that use of the hardware resource 24 should begin. The Ready_bit 422 serves to signal that the hardware resource 24 has completed what was requested of it. And the PendWriter_bit 424 and the PendReader_bit 426, respectively, serve to signal that there are pending waiters for write or read operations on the hardware resource 24.

If the computer system 12 has multiple processors (CPUs 22), the control bits 412 further include a ProcEnable_bit 428 for each CPU 22, and these are maintained generally rather than for the individual hardware resources 24.

The control registers 414 include a ThreadID_reg 430 for each CPU 22, as well as a first and a second temporary program counter registers (PC_temp1_reg 432 and PC_temp2_reg 434), and a first and a second exception address registers (Ex_addr1_reg 436 and Ex_addr2_reg 438). The ThreadID_reg 430 is used to store an unique identifier of the currently executing thread 20. The PC_temp1_reg 432 and PC_temp2_reg 434 are used to temporarily hold the current content of the program counter. And the Ex_addr1_reg 436 and Ex_addr2_reg 438 are used to hold addresses for exception routines that handle the adding of the pending waiters for write or read operations. Unlike most elements in the data structures 400, which change dynamically, the Ex_addr1_reg 436 and Ex_addr2_reg 438 may be loaded at initialization and then not change.

If the computer system 12 has multi-channel hardware devices 26, the control registers 414 further include a ReqID_reg 440 for each channel (effective hardware resource 24).

The waiting lists 416 maintained for each hardware resource 24 include a WriteWaiters_1st 444 and a ReadWaiters_1st 446. These respectively hold lists of the threads 20, if any, that are waiting to use the hardware resource 24 at a given time.

Figure 6E:
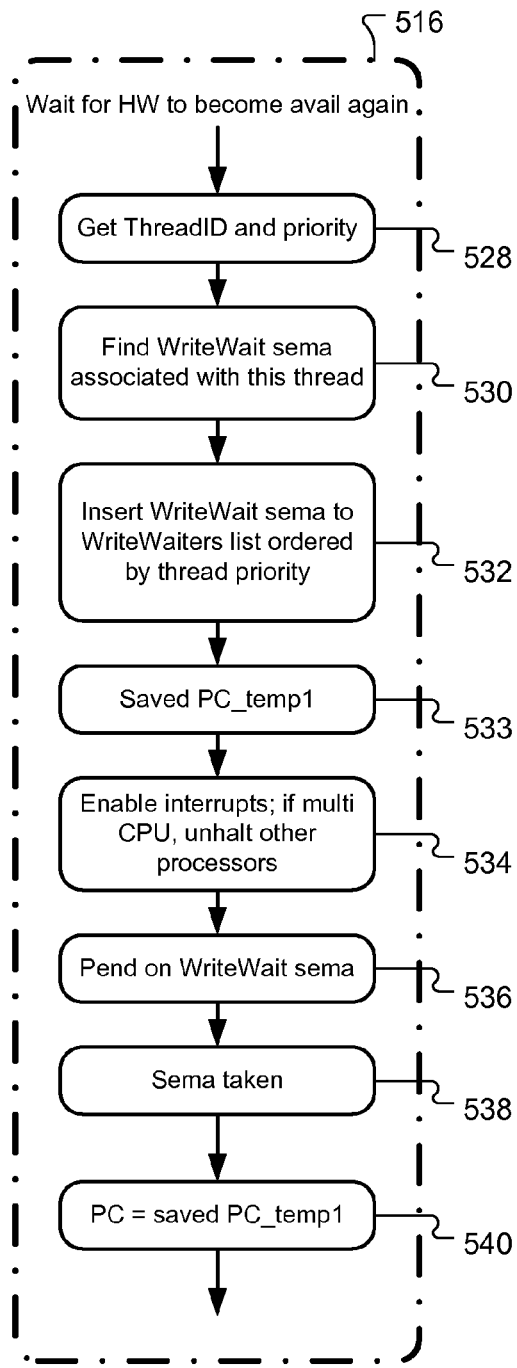
Figure 6F:
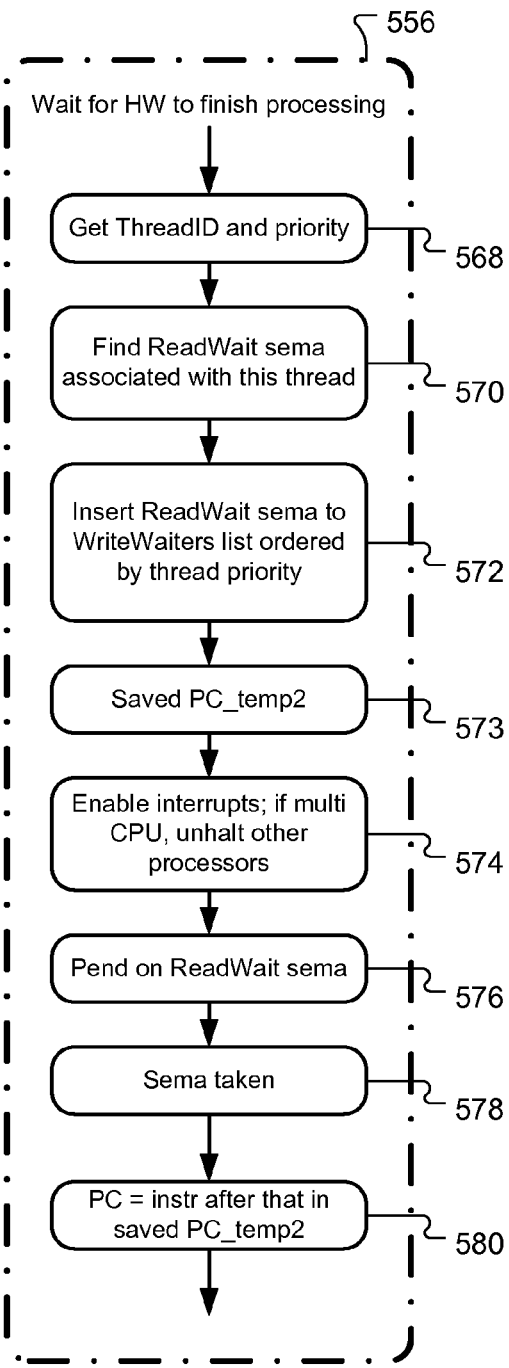
Figure 6G:
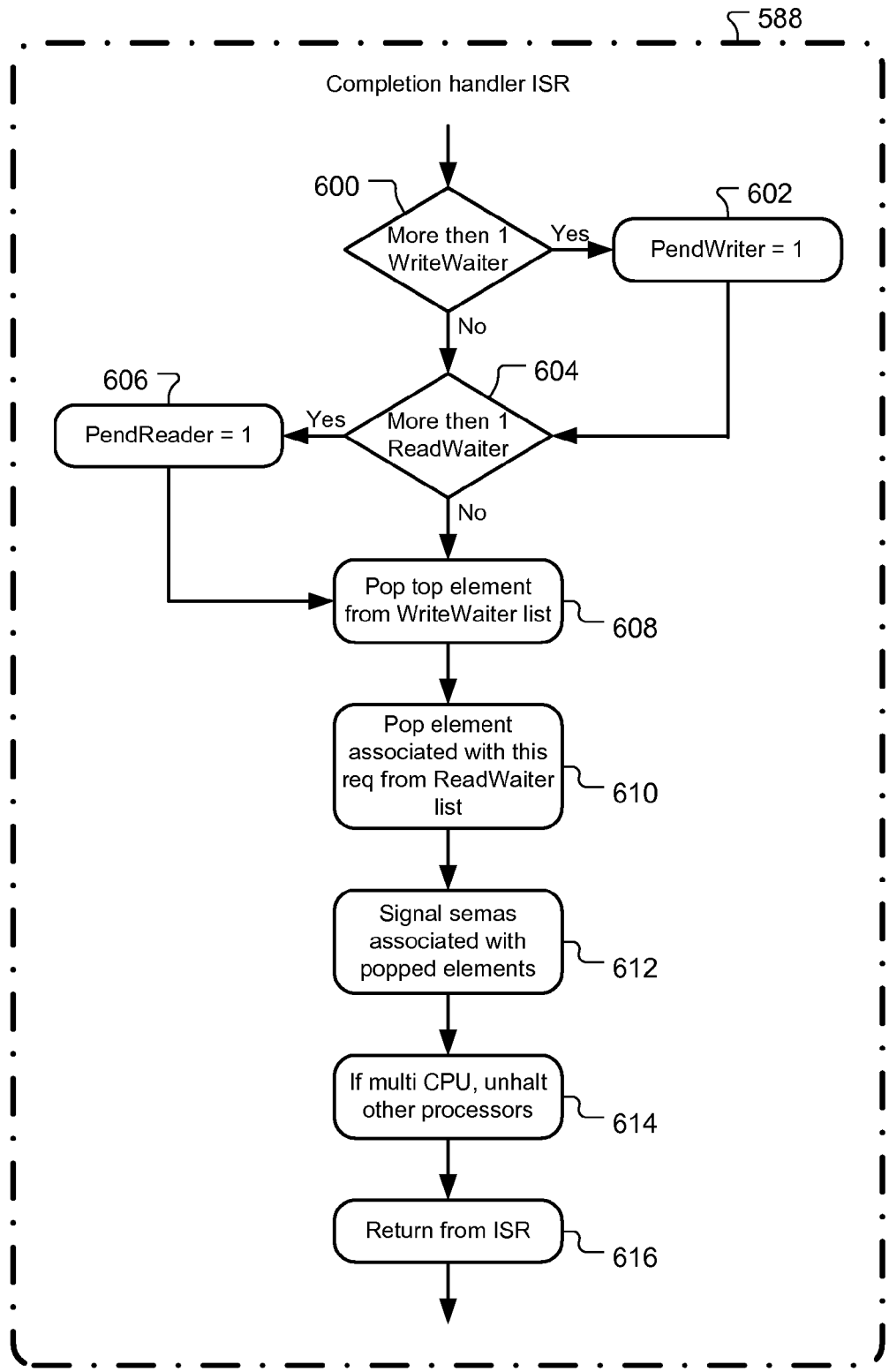

FIGS. 6a-g are a series of flow charts that depict an example process 500 where the inventive hardware locking system 10 is used to program a hardware accelerator. FIG. 6a shows an overall flowchart, FIGS. 6b-d show the details of "atomic" steps in FIG. 6a that are performed by the HW aspect 16, and FIGS. 6e-g show the details of steps in FIG. 6a that are performed by the SW aspect 14.

Collectively and in the context of this hypothetical hardware accelerator example, FIGS. 6a-g show five cases that especially merit consideration:

Case 1: Acquiring a lock when a hardware resource 24 is available;

Case 2: Acquiring a lock when a hardware resource 24 is "owned" by another thread 20;

Case 3: Obtaining information about the completion of a request of a hardware resource 24 after request completion;

Case 4: Obtaining information about the completion of a request of a hardware resource 24 before request completion; and Case 5: Informing waiters about request completion by a hardware resource 24.

Case 1:

In FIG. 6a step 502 through step 512 of the process 500 encompass Case 1. In step 502 the process 500 is entered, and in step 504 a request from the thread 20 seeking use of the hardware resource 24 is received.

In step 506 a determination is made whether the hardware resource 24 is available (i.e., if the Lock_bit 418 is currently set to "0"). The hardware resource 24 is available here (the alternate being Case 2, described presently). Accordingly, in step 508 the present thread 20 writes "1" to the Lock_bit 418. Note, when a multiple channel hardware device 26 is present the hardware locking system 10 can allow writing "1" to a series of Lock_bits 418 (or an equivalent mechanism) until all of the channels (hardware resources 24) are in use.

The present thread 20 now has "ownership" of the hardware resource 24, and in step 510 it proceeds to program general registers, etc. that will be used for whatever it is asking of the hardware resource 24. After this, in step 512, the thread 20 sets the Go_bit 420, signaling that use of the hardware resource 24 can begin immediately (note, the Go_bit 420 is merely a trigger here; it is not used as a "1" and "0" toggle like the other bits).

The thread 20 has now acquired the hardware resource 24 and Case 1 is finished.

Case 2:

In FIG. 6a step 502 through step 506 and step 514 through step 516 encompass Case 2. Steps 502-506 proceed much the same as just described, except here the hardware resource 24 is not available (i.e., the Lock_bit 418 here is currently set to "1"). Accordingly, in step 514 the HW aspect 16 prepares to add a waiter to the list of write waiters (WriteWaiters_1st 444). The HW aspect 16 handles step 514 "atomically" with respect to the SW aspect 14 of the computer system 12, thus avoiding the burdensome and error prone routines necessary in traditional software locking schemes. After this, in step 516 the SW aspect 14 "waits" for the hardware resource 24 to become available again. The process 500 then loops back to step 504, where another attempt at locking the particular hardware resource 24 can begin.

FIG. 6b shows step 514 in detail. In a step 518 the HW aspect 16 stores the program counter in PC_templ_reg 432. In a step 520 the HW aspect 16 sets the PendWriter_bit 424 to "1." In a step 522 the HW aspect 16 disables interrupts, thus preventing the chance of context switching and preserving consistency. If the computer system 12 has multiple processors (CPUs 22), in a step 524 the HW aspect 16 stalls the other processors by setting respective bits of the ProcEnable_bits 428 to disable them, thus insuring that the entries in the WriteWaiters_1st 444 stay consistent. And in a step 526 the HW aspect 16 sets the program counter to the address in jumpToAddWriteWaiters (i.e., to what is stored in Ex_addr1_reg 436).

Now that the HW aspect 16 has "atomically" dealt with the critical preparation work just described, the SW aspect 14 has the freedom to proceed safely with step 516.

FIG. 6e shows step 516 in detail for this embodiment of the inventive hardware locking system 10. Here semaphores associated with the threads 20 are used as a wait mechanism and the SW aspect 14 maintains a priority-ordered list of waiting threads. [Of course, FIFO or another ordering arrangement can be used in alternate embodiments.]

In a step 528 the SW aspect 14 obtains the ThreadID_reg 430 and its priority for the present thread 20. In a step 530 the SW aspect 14 finds out which WriteWait semaphore is associated with this particular thread 20. In a step 532 the SW aspect 14 inserts this WriteWait semaphore into the WriteWaiters_1st 444, based on thread priority in this example. In a step 533 the SW aspect 14 saves a copy of PC_temp1_reg 432 (for reasons discussed below). In a step 534 the SW aspect 14 enables interrupts and, if multiple processors (CPUs 22) are present, it un-halts the other processors (setting their respective ProcEnable_bits 428 to enable them). In a step 536 the SW aspect 14 leaves the present thread 20 pending on the WriteWait semaphore. [This wait is potentially infinite, but typically the Lock_bit 418 is released and this thread 20 gets to the top of the WriteWaiters_1st 444, and the semaphore is signaled (additional discussion is provided below).] In a step 538 the SW aspect 14 observes that the WriteWait semaphore has been taken. And in a step 540 the SW aspect 14 loads the program counter with the previously saved content of PC_temp1_reg 432 (the copy saved just before the interrupts were re-enabled is known to be correct).

Prequel to Cases 3-4:

Recall that Case 1 (acquiring a lock) ended with the Go_bit 420 being set, signaling that use of the hardware resource 24 can begin immediately. After this, the SW aspect 14 may continue doing other things unrelated to the request, but presumably it will eventually check to see if the request has been completed (see FIG. 6a). The SW aspect 14 does this by reading the Ready_bit 422. Note, when a multiple channel hardware device 26 is present the hardware locking system 10 should differentiate such requests based on the respective contents of the ThreadID_regs 430 for the channels (hardware resources 24).

With reference again to FIG. 6a, after step 512 (where the Go_bit 420 signals this) in a step 542 the HW aspect 16 performs the hardware accelerator action of our example being used here. Then, in a step 544 the HW aspect 16 sets the Ready_bit 422, signaling that the hardware resource 24 has completed what was requested of it. In a step 546 the HW aspect 16 next resets the Lock_bit 418, thus signaling that the hardware resource 24 is again available.

Meanwhile, in a step 548 the SW aspect 14 can perform whatever component specific action it wants to (e.g., tasks unrelated to the hardware resource 24, parallel execution, or simply nothing).

Case 3:

In FIG. 6a step 550 and step 552 encompass Case 3 (obtaining information after request completion). In step 550 the SW aspect 14 makes a determination whether the Ready_bit 422 is set. Here the hardware resource 24 has finished and the Ready_bit 422 has been reset (the alternate being Case 4, described presently). Accordingly, step 552 follows and the process 500 is exited.

Case 4:

In FIG. 6a step 550, step 554, step 556, and step 552 encompass Case 4 (obtaining information before request completion). In step 550 the SW aspect 14 makes the determination whether the Ready_bit 422 is set. Only here the hardware resource 24 has not yet finished and the Ready_bit 422 has not yet been reset. Accordingly, step 554 follows, in which the HW aspect 16 prepares to add a waiter to the list of read waiters (ReadWaiters_1st 446). The HW aspect 16 also handles step 554 "atomically" with respect to the SW aspect 14 of the computer system 12, thus here also avoiding the burdensome and error prone routines necessary in traditional software locking schemes. After this, in step 556 the SW aspect 14 "waits" for the hardware resource 24 to finish what was requested of it. Then step 552 follows and the process 500 is exited.

FIG. 6c shows step 554 in detail. In a step 558 the HW aspect 16 stores the program counter in PC_temp2_reg 434. In a step 560 the HW aspect 16 sets the PendReader_bit 426 to "1." In a step 562 the HW aspect 16 disables interrupts (preventing context switching and preserving consistency). If the computer system 12 has multiple CPUs 22, in a step 564 the HW aspect 16 stalls the others by setting respective of the ProcEnable_bits 428 to disable them, thus insuring that the entries in the ReadWaiters_1st 446 stay consistent. And in a step 566 the HW aspect 16 sets the program counter to the address in jumpToAddReadWaiters (i.e., to what is stored in Ex_addr2_reg 438).

The SW aspect 14 must add the thread 20 to the ReadWaiters_1st 446 (the list of threads 20 that are waiting for the completion of the request). This is only required if multi-channel hardware devices 26 are employed. If only single channel hardware resources 24 are present, there can only be one waiting thread 20 and the ReadWaiters_1st 446 will have only a single element.

Now that the HW aspect 16 has "atomically" dealt with the critical preparation work just described, the SW aspect 14 has the freedom to proceed safely with step 556.

FIG. 6f shows step 556 in detail for this embodiment of the inventive hardware locking system 10. Here as well semaphores associated with the threads 20 are used as a wait mechanism and the SW aspect 14 maintains a priority-ordered list of waiting threads. [FIFO or another ordering arrangement can alternately be used.]

In a step 568 the SW aspect 14 obtains the ThreadID_reg 430 and its priority for the present thread 20. In a step 570 the SW aspect 14 finds out which ReadWait semaphore is associated with this particular thread 20. In a step 572 the SW aspect 14 inserts this ReadWait semaphore into the ReadWaiters_1st 446, based on thread priority in this example. In a step 573 the SW aspect 14 saves a copy of PC_temp2_reg 434 (for reasons discussed below). In a step 574 the SW aspect 14 enables interrupts and, if multiple CPUs 22 are present, it un-halts the others (setting their respective ProcEnable_bits 428 to enable them). In a step 576 the SW aspect 14 leaves the present thread 20 pending on the ReadWait semaphore (potentially infinitely). In a step 578 the SW aspect 14 observes that the ReadWait semaphore has been taken. And in a step 580 the SW aspect 14 loads the program counter with the next instruction address after that previously saved as the content of the PC_temp2_reg 434 (the copy saved just before the interrupts were re-enabled is known to be correct, and here an offset to the next desired instruction is needed).

Prequel to Case 5:

Recall that after our exemplary hardware accelerator finished the HW aspect 16 reset the Lock_bit 418 (in step 546). The HW aspect 16 now checks if there are threads 20 waiting for a hardware resource 24 to become available (see e.g., Case 2) or if there are threads 20 waiting for a hardware resource 24 to complete processing a request (see e.g., Case 4). The HW aspect 16 does this by checking the PendWriter_bit 424 in a step 582 and checking the PendReader_bit 426 in a step 584. If neither of these are set, there are no waiters to be informed, and step 552 follows and the process 500 is exited.

Case 5:

In FIG. 6a step 586, step 588, and step 552 encompass Case 5 (informing the waiters about request completions). In step 586 the HW aspect 16 generates an interrupt and starts an interrupt service routine (ISR) running. As with step 514 and step 554, it is preferable that step 586 is done "atomically" with respect to the SW aspect 14, and having the HW aspect 16 handle it facilitates that. After this, in step 588 the SW aspect 14 completes running the ISR. Next step 552 follows and the process 500 is exited.

FIG. 6d shows step 586 in detail. If multi-channel hardware devices 26 are employed, in a step 590 the HW aspect 16 updates ReqID_regs 440 the ID of the completed request. In a step 592 the HW aspect 16 resets the PendWriter_bit 424, and in a step 594 the HW aspect 16 resets the PendReader_bit 426. If multiple CPUs 22 are present, in a step 596 the HW aspect 16 stalls the others by setting respective of the ProcEnable_bits 428 to disable them. And in step 598 the HW aspect 16 generates an interrupt which is served by the associated ISR.

Now that the HW aspect 16 has "atomically" dealt with the critical preparation work just described, the SW aspect 14 has the freedom to proceed safely with step 588.

FIG. 6g shows step 588 in detail for this embodiment of the inventive hardware locking system 10. In a step 600 the SW aspect 14 makes a determination whether the list of threads 20 waiting to program the hardware resource 24 has more than one entry. If so, in a step 602 it leaves the PendWriter_bit 424 set to "1." In a step 604 the SW aspect 14 also makes a determination whether the list of threads 20 waiting for completion of the last request of the hardware resource 24 has more than one entry. If so, in a step 606 it leaves the PendReader_bit 426 set to "1." Next, in a step 608, the SW aspect 14 fetches the top entry, if any, from the list of threads 20 waiting to program the hardware resource 24 (WriteWaiters_1st 444). Similarly, in a step 610, the SW aspect 14 fetches the top entry, if any, from the list of threads 20 associated with the completed request of the hardware resource 24 (ReadWaiters_1st 446). This situation is possible when multi-channel hardware devices 26 are present. For this the HW aspect 16 needs to be able to assign unique request IDs (in the ReqID_regs 440) at the time of programming that can later be read by the SW aspect 14 to enable it to associate threads 20 with the respective ReqID_regs 440.

In a step 612 the SW aspect 14 now signals the threads 20 (both those waiting for programming and those waiting for a completion) via the associated semaphores.

If multiple CPUs 22 are present, in a step 614 the SW aspect 14 now un-halts the ones halted in step 596 (since this is an ISR and the other processors have been halted during this operation and the modification of lists will have been safe and consistent). And, in a step 616, the SW aspect 14 returns from the interrupt.

Summarizing, it should now be clear that the inventive hardware locking system 10 provides significant runtime performance improvements compared to more common pure software based lock implementations, especially in terms of minimizing context switching and the overhead of acquiring and releasing locks. The hardware locking system 10 generally provides an inherently less burdensome mechanism for accessing hardware resources in modern computer systems than prior art approaches and that it especially provides a more efficient mechanism for accessing such hardware resources than the prior art approaches.

When the hardware locking system 10 is used there is no overhead for programming a hardware resource 24 that is not busy (i.e., there is no need to incur the substantial overhead of a software lock). The hardware resource 24 itself guarantees exclusivity of access within the threads 20 (both those running on the same and on different CPUs 22).

The hardware locking system 10 similarly has no overhead when getting the completion information if a hardware resource 24 has already completed a request. For example, a thread 20 here will put itself in a waiters list (ReadWaiters_1st 446) to be informed about the completion of a request, the hardware resource 24 will then generate an interrupt, and the associated ISR will signal the top element in the waiters list about the completion. The ISR will then run, regardless of when the thread 20 requested to be informed about completion. Accordingly, the ISR here executes only if there are waiting threads 20.

The hardware locking system 10 also provides freedom in the ordering of the lists (e.g., WriteWaiters_1st 444 and ReadWaiters_1st 446) for waiters waiting to program the hardware resources 24. Any desired ordering is possible, and thus is at the discretion of the implementer. In contrast, with prior art software locks, the waiters for locks are either FIFO, LIFO, or priority ordered by the OS.

While various embodiments have been described above, it should be understood that they have been presented by way of example only, and that the breadth and scope of the invention should not be limited by any of the above described exemplary embodiments, but should instead be defined only in accordance with the following claims and their equivalents.

What is claimed is:

1. In a computer system, a method of sharing a hardware resource between a plurality of threads, said method comprising:

accessing a request to use said hardware resource, said request received from a first thread of said plurality of threads;

determining, based upon a first portion of a data structure, whether said hardware resource is available for use by said first thread;

if said hardware resource is determined to be available for use by said first thread:

said first thread setting said first portion of said data structure to indicate that said hardware resource is unavailable for use by a second thread of said plurality of threads; and said first thread setting a second portion of said data structure to signal that said hardware resource is ready for use by said first thread; and if said hardware resource is determined to be unavailable for use by said first thread:
  causing said first thread to wait until said hardware resource is available for use by said first thread; and
  in response to said hardware resource becoming available, setting said first portion of said data structure to indicate that said hardware resource is available, wherein said setting said first portion to indicate that said hardware resource is available is performed by a hardware aspect of said computer system, wherein said hardware aspect includes said hardware resource.

2. The method of claim 1, wherein said data structure further comprises a third portion operable to store at least one thread identity value, said method further comprising:
  if said hardware resource is determined to be unavailable for use by said first thread, then said hardware aspect adding a first thread identity value associated with said first thread to said third portion of said data structure.

3. The method of claim 2, wherein said adding said first thread identity value is performed atomically with respect to said plurality of threads.

4. The method of claim 2, wherein said data structure further comprises a fourth portion, said method further comprising:
  responsive to completing said request:
    said hardware aspect setting said fourth portion of said data structure to signal to said first thread that said request is completed; and
    said hardware aspect resetting said first portion of said data structure to indicate that said hardware resource is available for use by at least one of said plurality of threads.

5. The method of claim 4, further comprising:
  a software of aspect of said computer system determining, based upon said fourth portion of said data structure, whether said hardware resource has completed said request, said software aspect comprising said computer system's operating system.

6. The method of claim 5, wherein said third portion of said data structure comprises a priority-ordered list of waiting threads, said list maintained by said software aspect.

7. The method of claim 4 further comprising:
  responsive to said setting said fourth portion, determining if a second thread of said plurality of threads is waiting to access said hardware resource; and
  if said second thread is waiting to access said hardware resource:
    said hardware aspect generating an interrupt; and
    said software aspect signaling said second thread to proceed with accessing said hardware resource.

8. The method of claim 7, wherein said determining said second thread, said generating said interrupt, and said signaling said second thread are performed atomically with respect to said plurality of threads, and wherein said determining if said second thread is waiting and said generating said interrupt are further performed atomically under control of said hardware aspect.

9. The method of claim 4, wherein said setting said fourth portion and said resetting said first portion are performed atomically with respect to said plurality of threads.

10. The method of claim 2, wherein said causing said first thread to wait further comprises causing said first thread to wait using a semaphore.

11. In a computer system, a hardware locking system for sharing a hardware resource between a plurality of threads, said hardware locking system comprising:
  a memory comprising a data structure;
  means for accessing a request to use said hardware resource, said request received from a first thread of said plurality of threads;
  means for determining, based upon a first portion of said data structure, whether said hardware resource is available for use by said first thread;
  said first thread setting, if said hardware resource is determined to be available for use by said first thread, said first portion of said data structure to indicate that said hardware resource is unavailable for use by a second thread of said plurality of threads;
  said first thread setting, if said hardware resource is determined to be available for use by said first thread, a second portion of said data structure signal to indicate that said hardware resource is ready for use by said first thread;
  means for causing said first thread to wait until said hardware resource is available for use by said first thread if said hardware resource is determined to be unavailable for use by said first thread; and
  a hardware aspect setting, in response to said hardware resource becoming available, said first portion of said data structure to indicate that said hardware resource is available, wherein said hardware aspect includes said hardware resource.

12. The hardware locking system of claim 11, wherein said data structure further comprises a third portion operable to store at least one thread identity value, wherein, if said hardware resource is determined to be unavailable for use by said first thread, then said hardware aspect adds a first thread identity value associated with said first thread to said second portion of said data structure.

13. The hardware locking system of claim 12, wherein said data structure further comprises a fourth portion, said hardware locking system further comprising:
  said hardware aspect setting, responsive to completing said request, said fourth portion of said data structure to signal to said first thread that said request is completed; and
  said hardware aspect resetting, responsive to completing said request, said first portion of said data structure to indicate that said hardware resource is available for use by at least one of said plurality of threads.

14. The hardware locking system of claim 13, further comprising:
  a software aspect determining, based upon said fourth portion of said data structure, whether said hardware resource has completed said request, said software aspect comprising said computer system's operating system.

15. The hardware locking system of claim 13 further comprising:
  said hardware aspect determining if a second thread of said plurality of threads is waiting to access said hardware resource;
  said hardware aspect generating, if said second thread is waiting to access said hardware resource, an interrupt; and
  said software aspect signaling, if said second thread is waiting to access said hardware resource, said second thread to proceed with accessing said hardware resource.

16. The hardware locking system of claim 15, wherein said setting said fourth portion of said data structure, said resetting, and said determining if said second thread is waiting are performed atomically with respect to said plurality of threads.

* * * * *